Sept. 29, 1959 K. KNOLL ET AL 2,906,009

HIGH TEMPERATURE-RESISTING INSULATING COATINGS
OF INCREASED DURABILITY AND METHODS OF
PRODUCING SAME

Filed April 25, 1955

United States Patent Office 2,906,009
Patented Sept. 29, 1959

2,906,009

HIGH TEMPERATURE-RESISTING INSULATING COATINGS OF INCREASED DURABILITY AND METHODS OF PRODUCING SAME

Karl Knoll, Feucht, near Nurnberg, and Gerhard Gahn, Erlangen, Germany, assignors to Siemens-Schuckertwerke Aktiengesellschaft, Berlin-Siemensstadt, Germany, a corporation of Germany Application April 25, 1955, Serial No. 503,494

Claims priority, application Germany April 30, 1954

4 Claims. (Cl. 29—195)

Figures 1, 2:
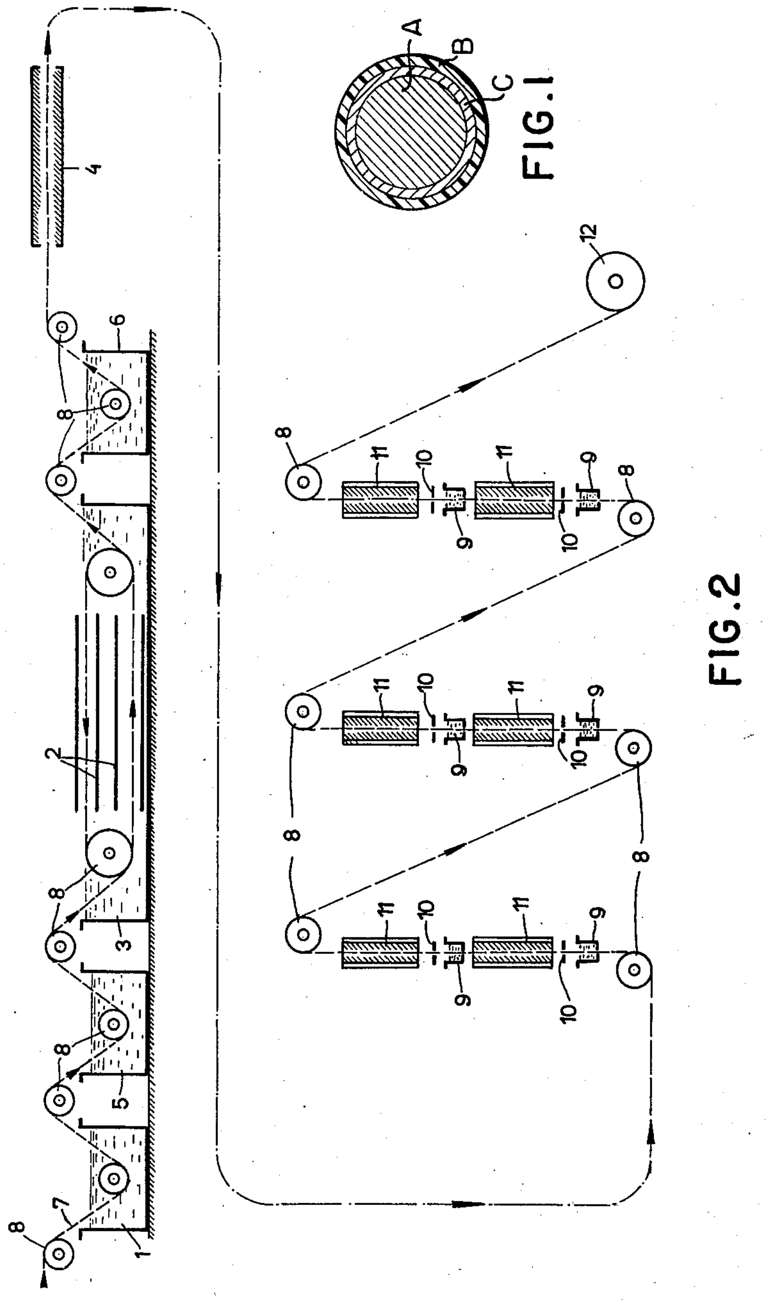

The present invention relates to new, high temperature-resisting insulating coatings on copper and copper alloys and to methods of producing same.

While lacquer coatings on copper and copper alloys as a rule show good adhesion, provided they are not exposed to temperatures of the order of 120° C. or, more particularly, 150° C., such coatings on copper and copper alloys, even if made from heat-resistant materials as provided by the various organo-silicone compounds, have a tendency to crack and to scale off if exposed to heat.

It is the primary object of the present invention to provide bodies, particularly conductor bodies, from copper and copper alloys with insulating coatings of improved crack and scaling-off resistance upon heating.

It is another object to furnish methods of providing bodies, particularly conductor bodies from copper and copper alloys, with such insulating coatings of improved crack and scaling-off resistance upon heating.

To this end, and in accord with the herein-disclosed invention, we interpose between the copper or copper alloy core of a conductor and the exterior lacquer layer a film of a metal taken from the group consisting of iron and cobalt.

The novel features which we consider characteristic of our invention are set forth with particularity in the appended claims. The invention itself, however, and any additional objects and advantages thereof will best be understood from the following description when read in conjunction with the accompanying drawings, in which:

Fig. 1 is a cross-sectional view of a copper or copper alloy conductor coated in the herein disclosed manner, and Fig. 2 is a diagrammatic presentation of an apparatus designed to carry out the herein claimed process.

Referring more particularly to Fig. 1, A indicates the conductor core, B the lacquer and C the intermediary layer of a metal of the iron group consisting of iron and cobalt.

The intermediary layer and the lacquer layer are preferably applied in immediate succession, as will be described in more detail in Example 3 in connection with Fig. 2, by pulling a metal wire, tape or the like, first through a galvanic bath and then through a lacquer applying device. Obviously, in conjunction therewith, the necessary steps of preparing the material for the galvanic bath and of the after-treatment must be included.

Aside from gaining time, the operation of these two steps in sequence has the advantage that preparation of the copper or copper alloy for the galvanizing bath and the application of the insulating coating immediately after applying the metal coating prevents oxidation or other impairment of the copper or copper alloy. A possible oxidation of the intermediate layer, for example an iron intermediate layer, is not dangerous, since iron oxides adhere firmly to the base.

We discovered that copper sheets or copper wires coated with a silicone lacquer, provided that an intermediate layer of iron or cobalt has been applied, even after a heat treatment of four weeks at about 200° C., can be repeatedly bent or folded without the lacquer showing a tendency to crack. Moreover, the lacquer remains substantially free from discoloration.

In contrast thereto, copper sheets and wires with the identical lacquers, but without the intermediate metal layer, show cracking and sealing-off of the lacquer coating upon the least mechanical stress after a heat treatment at 200° C. as short as nine hours.

We found that this phenomenon does not depend upon the type of silicone lacquer, but is due to the property of copper to produce, if exposed to higher temperatures, a brittle, badly adhering layer of cupreous oxide, even underneath heavy coatings of oxidation resistant lacquers. Consequently, it is immaterial whether straight silicone lacquers are used as coatings, or lacquers from alkyl siloxanes or from organosilicones modified with aldehyde resins, acetals or other lacquer producing materials. Although modified silicone lacquers adhere to clean, metallic copper initially almost as well as to other metal, if placed onto copper they crack like pure silicone coatings if exposed to bending after 10 to 20 hours. The period of exposure to heat of 200° C. after which the lacquers crack upon bending of the base depends upon the thickness of the lacquer coatings. With film thicknesses of about 2$\mu$, cracking occurs already after 1 to 2 hours at 200° C. while, in case of coatings as heavy as 30$\mu$, cracking occurs upon bending only after an exposure to 200° C. of 10 to 12 hours. This, however, is not due solely to the formation of a cupreous oxide layer, but is partly due to the fact that, under the catalytic influence of the copper, the polymerizing resinous film becomes increasingly ramified and, therefore, increasingly brittle. Depending upon the particular lacquer, the polymerization time of a coating on copper is only 1/20 to 1/5 of the polymerization time of the same coating on nickel or aluminum. Iron and cobalt, the salts of which are known as accelerators for silicone lacquers, likewise show a tendency to speed up the polymerization, but in a desirable manner in that they do not cause unduly high ramification of the polymeric compounds.

*Example 1*

An iron coating, 5$\mu$ in thickness, is put upon a 0.5 x 30 mm. copper tape, in passing the latter through a galvanic bath of 55° C., comprising per liter 250 gr. ferrous sulfate ($FeSO_4.7H_2$), 100 gr. ferrous chloride ($FeCl_2$), 50 gr. magnesium sulfate ($MgSO_4.7H_2O$) and 20 gr. boric acid ($H_3BO_3$), while applying current having an intensity of 6 amp./100 cm.$^2$ to the bath. After rinsing to remove any remnants of the bath liquor, and after drying, the band is provided with a 20$\mu$ silicone lacquer by dipping it four times with intermediary drying into a methylsiloxan resin solution ($CH_3$:Si=1.6:1), comprising 40% toluene and 10% cyclohexanone. The coated product is aged at 200° C. Even after 6 weeks of aging, neither cracking nor flaking off can be observed upon bending, while the same coating applied directly to copper flakes off already after 12 hours at 200° C.

*Example 2*

The copper tape of Example 1 is provided with a cobalt coating in passing it through a galvanic bath comprising per liter 150 gr. cobaltons sulfate ($CoSO_4.7H_2$), 20 gr. salt (NaCl) and 30 gr. boric acid ($H_3BO_3$), while applying current having an intensity of 5 amp./100 cm.$^2$ to the bath. After washing and drying, the band is lacquered in the manner of Example 1, with a methylphenyl silicone lacquer modified with 30% aldehyde resin, until a lacquer coating of 30$\mu$ thickness is obtained. At polymerization times similar to those attainable in contact with copper (1 hour at 150° C.), coatings are produced which neither peel nor crack upon bending after heating for more than 6 weeks at 180° C.

*Example 3*

A copper wire, 1.2 mm. in diameter, after having been lightly pickled by drawing it through nitric acid, is washed and galvanically covered with a $2\mu$ coating of iron. After another washing and drying, the wire is passed into a lacquering device and coated with a $30\mu$ film of an acetal modified methyl phenyl silicone resin. The coating remains substantially unchanged even after 6 weeks at 180° C. and is almost as elastic as prior to the heat-aging.

Fig. 2 illustrates an arrangement that is particularly suitable for this type of process. Interposed between the nitric acid pickling bath 1, the galvanizing bath 3 comprising anodes 2 and the drying oven 4, are the water baths 5 and 6. The copper wire 7 is passed in and out of these baths by means of guide rolls 8. Arranged behind the drying oven 4 is a plurality of dipping vessels 9, each followed by a stripper 10 to remove excessive lacquer and a drying oven 11 adjusted to a temperature of 320° C. Passing from the last drying oven, the finished insulated wire is wound upon the roll 12.

*Example 4*

The copper wire of Example 3 is provided with a $2\mu$ iron coating by means of a galvanic bath of 70° C., comprising per liter 450 gr. ferrous chloride and 500 gr. calcium chloride ($CaCl_2.6H_2$), to which a current having an intensity of 3 amp./100 $cm.^2$ is applied. Thereafter, a 25 to $30\mu$ coating of a phenylmethylsiloxan resin (20% phenyl) is applied to the wire by means of six successive coating and drying passes as described in Example 3. After six weeks of aging at 200° C., the coating is substantially unchanged and adheres rigidly to the wire, even when bending.

We claim:

1. A conductor body having high temperature-proof insulating coatings of increased crack and scaling-off resistance, comprising a metal core selected from the group of copper and copper alloys, a thin intermediate iron film on said core and an organo-silicone coating directly applied on said intermediate film.

2. An electroconductive strand having high temperature-proof insulating coatings of increased crack and scaling-off resistance, comprising a metal core selected from the group of copper and copper alloys, an about $2\mu$ intermediate film of galvanic iron on said core, and an organo-silicone coating directly applied on said intermediate film.

3. A conductor body having high temperature-proof insulating coating of increased crack and scaling-off resistance, comprising a metal core selected from the group of copper and copper alloys, a galvanic intermediate film of iron on said core and, directly applied on said intermediate film, a coating of the order of $30\mu$ in thickness, consisting of a polymerized phenylmethylsiloxan resin, 20% of which consists of the phenyl component.

4. Method of increasing the crack and scaling-off resistance of high temperature-proof lacquers, particularly organo-silicone lacquers applied to copper and copper alloy bodies, which comprises coating such bodies first with an intermediary film of iron, and then applying upon the iron an organo-silicone lacquer.

References Cited in the file of this patent

UNITED STATES PATENTS

| | | |
|---|---|---|
| 2,102,358 | Elder | Dec. 14, 1937 |
| 2,240,805 | Semon | May 5, 1941 |
| 2,313,234 | Gavitt | Mar. 9, 1943 |
| 2,386,466 | Hyde | Oct. 9, 1945 |
| 2,495,630 | Dorst | Jan. 24, 1950 |
| 2,688,182 | Dorst | Sept. 7, 1954 |
| 2,700,212 | Flynn | Jan. 25, 1955 |
| 2,754,353 | Gilliam | July 10, 1956 |